US012606648B2

(12) United States Patent
Khankal et al.

(10) Patent No.: US 12,606,648 B2
(45) Date of Patent: Apr. 21, 2026

(54) CENTRALIZED HYDROCARBON TREATMENT IN A POLYMER PRODUCTION PROCESS

(71) Applicant: Chevron Phillips Chemical Company LP, The Woodlands, TX (US)

(72) Inventors: Reza Khankal, Bellaire, TX (US); Hetian Li, Houston, TX (US); Timothy O. Odi, Kingwood, TX (US); Anurag Gupta, Sugar Land, TX (US); Willie J. Isom, Missouri City, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 536 days.

(21) Appl. No.: 18/351,935

(22) Filed: Jul. 13, 2023

(65) Prior Publication Data

US 2025/0019471 A1      Jan. 16, 2025

(51) Int. Cl.

| | |
|---|---|
| *B01D 15/00* | (2006.01) |
| *B01J 19/00* | (2006.01) |
| *C08F 2/01* | (2006.01) |
| *C08F 6/00* | (2006.01) |
| *C08F 6/28* | (2006.01) |
| *C08J 11/02* | (2006.01) |

(52) U.S. Cl.
CPC .............. *C08F 6/006* (2013.01); *B01D 15/00* (2013.01); *B01J 19/0053* (2013.01); *C08F 2/01* (2013.01); *C08F 6/005* (2013.01); *C08F 6/28* (2013.01); *C08J 11/02* (2013.01)

(58) Field of Classification Search
None
See application file for complete search history.

(56) References Cited

U.S. PATENT DOCUMENTS

| | | | |
|---|---|---|---|
| 2,825,721 | A | 3/1958 | Hogan |
| 3,119,569 | A | 1/1964 | Baricordi |
| 3,225,023 | A | 12/1965 | Hogan |
| 3,226,205 | A | 12/1965 | Rohlfing |
| 3,242,099 | A | 3/1966 | Manyik |
| 3,622,521 | A | 11/1971 | Hogan |
| 3,625,864 | A | 12/1971 | Horvath |
| 3,887,494 | A | 6/1975 | Dietz |
| 3,900,457 | A | 8/1975 | Witt |
| 3,976,632 | A | 8/1976 | Delap |
| 4,053,436 | A | 10/1977 | Hogan |
| 4,081,407 | A | 3/1978 | Short |
| 4,151,122 | A | 4/1979 | McDaniel |
| 4,182,815 | A | 1/1980 | McDaniel |
| 4,247,421 | A | 1/1981 | McDaniel |
| 4,248,735 | A | 2/1981 | McDaniel |
| 4,296,001 | A | 10/1981 | Hawley |
| 4,297,460 | A | 10/1981 | McDaniel |
| 4,301,034 | A | 11/1981 | McDaniel |
| 4,339,559 | A | 7/1982 | McDaniel |
| 4,364,842 | A | 12/1982 | McDaniel |

(Continued)

FOREIGN PATENT DOCUMENTS

| | | |
|---|---|---|
| EP | 1165225 B1 | 8/2006 |
| EP | 1549426 82 | 1/2018 |

*Primary Examiner* — Richard A. Huhn
(74) *Attorney, Agent, or Firm* — Scheef & Stone, LLP

(57) ABSTRACT

Treaters that are configured to remove one or more contaminants from hydrocarbon streams recovered from a polymerization process are located upstream of the monomer and diluent recovery unit.

20 Claims, 2 Drawing Sheets

(56) References Cited

U.S. PATENT DOCUMENTS

| | | | |
|---|---|---|---|
| 4,364,854 A | 12/1982 | McDaniel | |
| 4,364,855 A | 12/1982 | McDaniel | |
| 4,392,990 A | 7/1983 | Witt | |
| 4,397,768 A | 8/1983 | Hawley | |
| 4,405,501 A | 9/1983 | Witt | |
| 4,444,962 A | 4/1984 | McDaniel | |
| 4,444,964 A | 4/1984 | McDaniel | |
| 4,444,965 A | 4/1984 | McDaniels | |
| 4,460,756 A | 7/1984 | McDaniel | |
| 4,504,638 A | 3/1985 | McDaniel | |
| 4,547,557 A | 10/1985 | McDaniel | |
| 4,735,931 A | 4/1988 | McDaniel | |
| 4,794,096 A | 12/1988 | Ewen | |
| 4,806,513 A | 2/1989 | McDaniel | |
| 4,808,561 A | 2/1989 | Welborn, Jr. | |
| 4,820,785 A | 4/1989 | McDaniel | |
| 4,855,271 A | 8/1989 | McDaniel | |
| 4,939,217 A | 7/1990 | Stricklen | |
| 4,981,831 A | 1/1991 | Knudsen | |
| 4,988,657 A | 1/1991 | Martin | |
| 5,037,911 A | 8/1991 | McDaniel | |
| 5,179,178 A | 1/1993 | Stacy | |
| 5,191,132 A | 3/1993 | Patsidis | |
| 5,210,362 A | 5/1993 | Alt | |
| 5,219,817 A | 6/1993 | McDaniel | |
| 5,221,654 A | 6/1993 | McDaniel | |
| 5,237,025 A | 8/1993 | Benham | |
| 5,244,990 A | 9/1993 | Mitchell | |
| 5,275,992 A | 1/1994 | Mitchell | |
| 5,347,026 A | 9/1994 | Patsidis | |
| 5,399,636 A | 3/1995 | Alt | |
| 5,401,817 A | 3/1995 | Palackal | |
| 5,420,320 A | 5/1995 | Zenk | |
| 5,436,305 A | 7/1995 | Alt | |
| 5,451,649 A | 9/1995 | Zenk | |
| 5,480,848 A | 1/1996 | Geerts | |
| 5,496,781 A | 3/1996 | Geerts | |
| 5,498,581 A | 3/1996 | Welch | |
| 5,541,272 A | 7/1996 | Schmid | |
| 5,554,795 A | 9/1996 | Frey | |
| 5,563,284 A | 10/1996 | Frey | |
| 5,565,592 A | 10/1996 | Patsidis | |
| 5,571,880 A | 11/1996 | Alt | |
| 5,576,259 A | 11/1996 | Hasegawa | |
| 5,594,078 A | 1/1997 | Welch | |
| 5,610,247 A | 3/1997 | Alt | |
| 5,627,247 A | 5/1997 | Alt | |
| 5,631,203 A | 5/1997 | Welch | |
| 5,631,335 A | 5/1997 | Alt | |
| 5,654,454 A | 8/1997 | Peifer | |
| 5,668,230 A | 9/1997 | Schertl | |
| 5,705,478 A | 1/1998 | Boime | |
| 5,705,579 A | 1/1998 | Hawley | |
| 5,807,938 A | 9/1998 | Kaneko | |
| 5,919,983 A | 7/1999 | Rosen | |
| 6,300,271 B1 | 10/2001 | McDaniel | |
| 6,355,594 B1 | 3/2002 | McDaniel | |
| 6,395,666 B1 | 5/2002 | McDaniel | |
| 6,548,442 B1 | 4/2003 | McDaniel | |
| 6,559,247 B2 | 5/2003 | Kufeld | |
| 6,613,712 B1 | 9/2003 | McDaniel | |
| 6,653,416 B2 | 11/2003 | McDaniel | |
| 6,831,141 B2 | 12/2004 | McDaniel | |
| 6,833,338 B2 | 12/2004 | McDaniel | |
| 7,294,599 B2 | 11/2007 | Jensen | |
| 7,312,283 B2 | 12/2007 | Martin | |
| 7,417,097 B2 | 8/2008 | Yu | |
| 8,114,946 B2 | 2/2012 | Yang | |
| 11,180,587 B2 | 11/2021 | Garner | |
| 2004/0116626 A1* | 6/2004 | Burns | C08F 10/02 526/70 |
| 2016/0361705 A1* | 12/2016 | Romig | B01D 53/0462 |

* cited by examiner

CENTRALIZED HYDROCARBON TREATMENT IN A POLYMER PRODUCTION PROCESS

FIELD OF THE DISCLOSURE

The present disclosure generally relates to polymerization processes and systems, and more particularly, to removing contaminants from hydrocarbon streams that are recovered from a polymerization reactor effluent.

BACKGROUND

Loop slurry polymerization reactors circulate a reaction medium containing a liquid diluent, olefin monomer(s), and catalyst under polymerization conditions to form solid polymer particles in the reaction medium. The reaction medium is withdrawn from the reactor as a reactor effluent. The reactor effluent is subjected to separations that separate the solid polymer particles from liquid and gaseous components in the reactor effluent. The liquid and gaseous components are then subjected to various separations to recover streams of hydrocarbons that can be reused in the polymerization process or used in another process.

The streams of hydrocarbons can be treated by passing the streams through treaters containing desiccants that are configured to remove contaminants, and to produce treated streams that can be reused or repurposed. One or more treaters can be used to treat each stream, which creates a distributed number of treaters in a polymerization system. The large number of treaters can create maintenance and operation burdens. Moreover, the treaters that treat each stream of hydrocarbons are on the back-end of the monomer and diluent recovery units, between these units and the reactor. Thus, contaminants flow through the various separations before being removed in the treaters on the back end.

SUMMARY

Disclosed is a process that includes: separating a polymer product stream into an untreated vapor stream, an untreated liquid stream, and a polymer stream; treating the untreated vapor stream with a first desiccant to produce a treated vapor stream; treating the untreated liquid stream with a second desiccant to produce a treated liquid stream; and introducing the treated vapor stream and the treated liquid stream to a monomer diluent recovery unit.

Disclosed is a polymerization system that includes: a polymerization reactor configured to polymerize one or more olefin monomers to produce a solid polymer; a polymer product stream connected to an outlet of the polymerization reactor and configured to receive a reactor effluent containing the solid polymer; a product recovery system coupled to the polymer product stream and configured to receive the reactor effluent and to separate the reactor effluent into an untreated vapor stream, an untreated liquid stream, and a polymer stream; a first treater coupled to the untreated vapor stream and containing a first desiccant configured to remove one or more of a plurality of contaminants from the untreated vapor stream to produce a treated vapor stream; a second treater coupled to the untreated liquid stream and containing a second desiccant configured to remove one or more the plurality of contaminants from the untreated liquid stream to produce a treated liquid stream; and a monomer diluent recovery unit coupled to the first treater and to the second treater and configured to receive the treated vapor stream from the first treater and the treated liquid stream from the second treater.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The disclosed processes and polymerization systems relocate treaters that are configured to remove contaminants from hydrocarbon streams recovered from a polymerization process, from being downstream of the monomer and diluent recovery unit to being upstream of the monomer and diluent recovery unit. Locating the treaters upstream of the monomer and diluent recovery units avoids the flow of contaminants through the various separations in a polymerization process to recover hydrocarbon streams for reuse in the polymerization process (or for another purpose).

Figure 1:
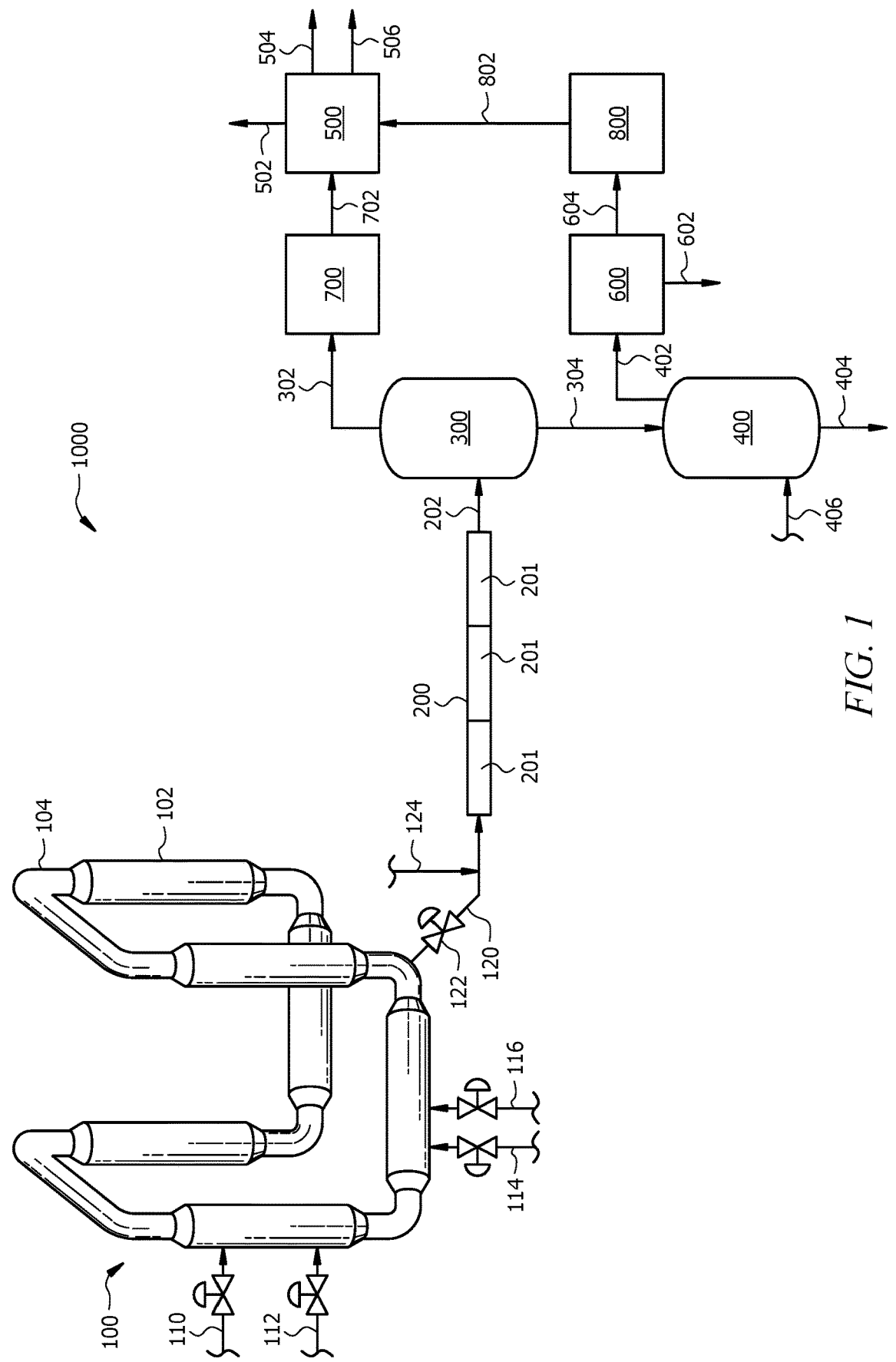
FIG. 1 illustrates a schematic diagram of a polymerization system having centralized treatment for removal of contaminants.

FIG. 1 illustrates a schematic diagram of a polymerization system 1000 having centralized treatment for removal of contaminants. The polymerization system 1000 includes a loop slurry polymerization reactor 100, a flashline heater 200, a product separator 300, a purge column 400, a monomer diluent recovery unit (MDRU) 500, a diluent nitrogen recovery unit (DNRU) 600, a first treater 700, and a second treater 800.

Generally, the loop slurry polymerization reactor 100 is configured to polymerize olefin monomers (e.g., ethylene, 1-butene, 1-hexene, or combinations thereof) in presence of a catalyst to form a solid polymer. A polymer product stream 120 is connected to an outlet of the loop slurry polymerization reactor 100, and a product separator 300 is coupled to the polymer product stream 120 (e.g., in some aspects, via a flashline heater 200 as described herein). Solid polymer recovered from the product separator 300 can flow to the purge column 400, for removal of residual hydrocarbons from the solid polymer particles. Solid polymer is then recovered from the purge column 400. An untreated vapor stream 302 from the product separator 300 is treated in a first treater 700, and an untreated liquid stream 604 recovered from the diluent nitrogen recovery unit 600 is treated in a second treater 800. Treated streams 702 and 802 from the treaters 700 and 800 flow to a monomer diluent recovery unit 500, where various hydrocarbon streams 502, 504, 506, and optionally 508, are recovered as described herein.

The loop slurry polymerization reactor 100 can include one or more loop slurry polymerization reactors. When one loop slurry polymerization reactor is utilized, the loop slurry polymerization reactor 100 can be used as a single reactor, or in series with other types of polymerization reactors such as gas-phase reactors (also known as fluidized bed reactors), autoclave reactors, or combinations thereof. When more than one polymerization reactor is utilized in any embodiment that includes the loop slurry polymerization reactor 100, no polymerization reactor is located downstream of the loop slurry polymerization reactor 100 illustrated in FIG. 1.

When more than one polymerization reactor is utilized in any embodiment that includes the loop slurry polymerization reactor 100, the polymerization system 1000 can include a polymer transfer device configured to transfer the polymers resulting from the first polymerization reactor into the loop slurry polymerization reactor 100. The desired polymerization conditions in one of the reactors can be different from the operating conditions of the other reactor(s). Alternatively, polymerization in multiple reactors can include the manual transfer of polymer from one reactor to the loop slurry polymerization reactor 100 for continued polymerization.

The loop slurry polymerization reactor 100 is configured to polymerize one or more olefin monomers and optionally comonomers (one or more than one comonomer) in a presence of a catalyst to produce homopolymers, copolymers, terpolymers, or combinations thereof. The loop slurry polymerization reactor 100 can comprise vertical and horizontal pipe segments 102 and pipe elbows 104. Each pipe segment 102 is connected to an elbow 104 on each end of the pipe segment 102.

Olefin monomer, diluent, catalyst, comonomer, or combinations thereof can be continuously fed to the loop slurry polymerization reactor 100. Olefin monomer can be fed via stream 110, which can have a control valve contained in the stream 110 for control of the flow of the olefin monomer into the loop slurry polymerization reactor 100. Olefin comonomer can be fed via stream 112, which can have a control valve contained in the stream 112 for control of the flow of the olefin comonomer into the loop slurry polymerization reactor 100. Diluent can be fed via stream 114, which can have a control valve contained in the stream 114 for control of the flow of the diluent into the loop slurry polymerization reactor 100. Catalyst can be fed via stream 116, which can have a control valve contained in the stream 116 for control of the flow of the catalyst into the loop slurry polymerization reactor 100.

The feed components described above can be circulated (e.g., by a pump) in the loop slurry polymerization reactor 100 for a period of time to produce a polymer in the reaction medium.

Polymerization conditions that can be controlled for efficiency and to provide desired polymer properties can include temperature, pressure, and the concentrations of various feed components (e.g., olefin monomer, olefin comonomer, diluent, catalyst, or combinations thereof. In aspects, the polymerization conditions as well as the flow of any combination of the components to the loop slurry polymerization reactor 100 can be referred to as manipulated variables that are the control variables. In other aspects, the desired polymer properties can also be referred to as the control variables that are response to the manipulated variables.

Polymerization temperature can affect catalyst productivity, polymer molecular weight, and molecular weight distribution. A suitable polymerization temperature can be any temperature below the de-polymerization temperature. In aspects, the polymerization temperature in the loop slurry polymerization reactor 100 includes temperatures in a range of from about 60° C. to about 121° C.; alternatively, from about 65° C. to about 110° C.; alternatively, from about 70° C. to about 90° C.; alternatively, from about 75° C. to about 85° C. Temperature is typically controlled by circulating a coolant in cooling jackets that surround each of the vertical segments 102 of the loop slurry polymerization reactor 100. Because polymerization reactions in the loop slurry polymerization reactor are generally exothermic, a coolant that flows through the cooling jackets absorbs heat from the vertical segments 102 to control the temperature of the loop slurry polymerization reactor 100. The flow rate of coolant can be adjusted depending on the temperature of the reactor 100. In aspects, the reactor temperature can be manipulated by adjustment of the coolant inlet temperature, the coolant mass flow rate, or both.

The polymerization pressure in the loop slurry polymerization reactor 100 can include pressures of less than 1000 psig. The pressure can be controlled by feeding olein monomer, any olefin comonomer, diluent, and catalyst into the loop slurry polymerization reactor 100 at a pressure that is sufficient to maintain the polymerization pressure.

The concentrations of the feed components in the reaction medium can be controlled by control valves in the respective feed streams. The flow rate of olefin monomer in stream 110 can be controlled with the control valve in stream 110, the flow rate of any optional olefin comonomer in stream 112 can be controlled with the control valve in stream 112, the flow rate of diluent in stream 114 can be controlled with the control valve in stream 114, and the flow rate of catalyst in stream 116 can be controlled with the control valve in stream 116.

Olefin monomers contemplated herein typically include olefin compounds having from 2 to 30 carbon atoms per molecule and having at least one olefinic double bond. Acyclic, cyclic, polycyclic, terminal (a), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, or combinations thereof. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{24}$ olefin; alternatively, a $C_2$-$C_{12}$ olefin; alternatively, a $C_6$-$C_{24}$ olefin; alternatively, a $C_2$-$C_{10}$ α-olefin; alternatively, propylene, 1-butene, 1-pentene, 1-hexene, 1-heptene, 1-octene, 1-decene, or styrene; alternatively, ethylene, propylene, 1-butene, 1-hexene, or 1-octene; alternatively, ethylene or propylene; alternatively, ethylene; or alternatively, propylene.

When a comonomer is fed to the loop slurry polymerization reactor 100, the olefin monomer can comprise, for example, ethylene or propylene, which is copolymerized with at least one comonomer. In some aspects, the olefin monomer can include ethylene and the olefin comonomer can include propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or combinations thereof.

In aspects, the amount of olefin comonomer in the loop slurry polymerization reactor 100 can be from about 0.01 wt % to about 50 wt %; alternatively, from about 0.01 to about 40 wt %; alternatively, from about 0.1 wt % to about 35 wt %; alternatively, from about 0.5 wt % to about 20 wt %, based on the total weight of the olefin monomer and olefin comonomer in the loop slurry polymerization reactor 100.

The diluent can include any saturated hydrocarbon having 4 to 20 carbon atoms. Examples of the diluent can include, but are not limited to, propane, isobutane, n-butane, n-pentane, isopentane, neopentane, n-hexane, cyclohexane, or combinations thereof. Some loop polymerization reactions can occur under bulk conditions where no diluent is used. An example is bulk polymerization of propylene as disclosed in U.S. Pat. No. 11,180,587, which is incorporated by reference herein in its entirety.

Examples of catalysts that can be used in the polymerization of the loop slurry polymerization reactor 100 include, but are not limited to, Ziegler catalyst, Ziegler-Natta catalyst, metallocene catalyst, chromium-based catalysts, or combinations thereof. In some aspects, the catalyst can be part of a catalyst system that includes, in addition to the catalyst, a support, a co-catalyst, a carrier (e.g., any inert hydrocarbon liquid such as any of those suitable for use as diluent), or both a co-catalyst and a carrier. In additional aspects, two catalysts can be present in a dual catalyst system.

In some aspects, a dual catalyst system can comprise a first metallocene catalyst component and a second metallocene catalyst component. The first metallocene catalyst component and the second metallocene catalyst component independently can comprise, for example, a transition metal (one or more than one) from Groups IIIB-VIIIB of the Periodic Table of the Elements. In one embodiment, the first metallocene catalyst component and the second metallocene catalyst component independently system can comprise a Group III, IV, V, or VI transition metal, or a combination of two or more transition metals. The first metallocene catalyst component and the second metallocene catalyst component independently can comprise chromium, titanium, zirconium, hafnium, vanadium, or a combination thereof, or can comprise titanium, zirconium, hafnium, or a combination thereof, in other embodiments. Accordingly, the first metallocene catalyst component and the second metallocene catalyst component independently can comprise titanium, or zirconium, or hafnium, either singly or in combination.

In other aspects, the dual catalyst system can comprise a first transition metal compound, a second transition metal compound, and an activator-support. In such embodiments, the processes and systems disclosed herein are not limited to any particular transition metal-based catalyst system; thus, any transition metal-based catalyst system (one or more than one) suitable for the polymerization of an olefin monomer (and optional olefin comonomer(s)) can be employed with an activator-support. The first transition metal compound and the second transition metal compound independently can comprise, for example, a transition metal (one or more than one) from Groups IIIB-VIIIB of the Periodic Table of the Elements. In one embodiment, the first transition metal compound and the second transition metal compound independently system can comprise a Group III, IV, V, or VI transition metal, or a combination of two or more transition metals. The first transition metal compound and the second transition metal compound independently can comprise chromium, titanium, zirconium, hafnium, vanadium, or a combination thereof, or can comprise chromium, titanium, zirconium, hafnium, or a combination thereof, in other embodiments. Accordingly, the first transition metal compound and the second transition metal compound independently can comprise chromium, or titanium, or zirconium, or hafnium, either singly or in combination. In an embodiment, the first transition metal compound can produce the lower molecular weight component of the olefin polymer, and the second transition metal compound can produce the higher molecular weight component of the olefin polymer.

Various transition metal-based catalyst systems known to a skilled artisan are useful in the polymerization of olefins. These include, but are not limited to, Ziegler-Natta based catalyst systems (e.g., Ziegler-based catalyst systems), chromium-based catalyst systems, metallocene-based catalyst systems, Phillips catalyst systems, Ballard catalyst systems, coordination compound catalyst systems, post-metallocene catalyst systems, and the like, including combinations thereof.

For instance, the dual catalyst system can comprise a Ziegler-Natta based catalyst system, a chromium-based catalyst system, and/or a metallocene-based catalyst system; alternatively, a Ziegler-Natta based catalyst system; alternatively, a chromium-based catalyst system; or alternatively, a metallocene-based catalyst system. Examples of representative and non-limiting transition metal-based catalyst systems include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,900,457, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, and 7,312,283, each of which is incorporated herein by reference in its entirety.

In some aspects, the catalyst system can comprise an activator, an activator-support, an aluminoxane compound, an organoboron or organoborate compound, an ionizing ionic compound, or combinations thereof. Examples of activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. Examples of an activator-support can include fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof.

Co-catalysts can include, but are not limited to, metal alkyl, or organometal, co-catalysts, with the metal encompassing boron, aluminum, and the like. The dual catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include, trimethylaluminum, triethylaluminum, tri-n-propylaluminum, tri-n- butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof.

The polymer that is produced in the loop slurry polymerization reactor 100 can be an ethylene homopolymer, a propylene homopolymer, an ethylene copolymer (e.g., ethylene/1-butene, ethylene/1-hexene, or ethylene/1-octene), a propylene random copolymer, a propylene block copolymer, or combinations thereof. In some aspects, the polymer can be a low density polyethylene (LDPE), linear low density polyethylene (LLDPE), medium density polyethylene (MDPE), high density polyethylene (HDPE), or a combination thereof.

A reactor controller can be used to control equipment of the loop slurry polymerization reactor 100 so as to control polymerization conditions in the loop slurry polymerization reactor 100. For example, the reactor controller can be embodied as a distributed control system (DCS) or a programmable logic (PLC) based system. In aspects, the reactor controller can be operably connected to control valves in streams 110, 112, 114, and 116, to control the flow of olefin monomer, olefin comonomer, diluent, and catalyst into the loop slurry polymerization reactor 100 via actuation of the control valves in the streams 110, 112, 114, and 116. However, it is to be understood that the reactor controller can be configured to receive signals from any number and type of sensors associated with the polymerization system 1000, such as flow meters, pump motors, thermocouples, pressure transducers, gas analyzers, particle size analyzers, or combinations thereof, that are connected or coupled to the loop slurry polymerization reactor 100, and to control any equipment associated with the operation of the loop slurry polymerization reactor 100.

Some of the reaction medium can be removed, e.g., continuously, from the loop slurry polymerization reactor 100 as reactor effluent. The reactor effluent can be embodied as a suspension comprising solid polymer particles in a liquid comprising the diluent, olefin monomer, and any comonomer. The reactor effluent can also include olefin monomer in a gas phase that is separate from the liquid. In aspects, reactor effluent is removed from the loop slurry polymerization reactor 100 via polymer product stream 120. The polymer product stream 120 can include a continuous take-off valve 122 to regulate the removal of reactor effluent from the loop slurry polymerization reactor 100. Because in-line analyzers of the liquid of the reactor effluent can foul and file, it is contemplated within scope of this disclosure that the polymer product stream 120 contains no liquid analyzer equipment.

In aspects, reactor effluent withdrawn from the loop slurry polymerization reactor 100 may convey through the polymer product stream 120. A differential pressure between an outlet of the loop slurry polymerization reactor 100 and the product separator 300 may provide motive force to convey the reactor effluent in polymer product stream 120; alternatively, motive force can be provided or supplemented with other equipment known in the art with aid of this disclosure.

In aspects, the system 1000 can also include a catalyst deactivation stream 124 that is connected to the polymer product stream 120 downstream of the continuous take-off valve 122. In additional aspects, the catalyst deactivation stream 124 can be connected to the polymer product stream 120 upstream of the flashline heater 200. Examples of catalyst deactivators include carbon monoxide, water, an alcohol such as methanol, ethanol, or propanol, a mixture of alcohols, or a combination thereof. The catalyst deactivation stream 124 is configured to introduce a catalyst deactivator into the polymer product stream 120.

The flashline heater 200 can include a plurality of segments 201 connected in series. One or more of the segments 201 of the flashline heater 200 may comprise a segment set. In embodiments, a segment set may comprise a group of the segments 201 of the flashline heater 200 which are connected in series and which may share a common parameter such as inner diameter, whether the segments are heated, or combinations thereof; alternatively, a single segment of the plurality of segments 201 may comprise a segment set which has a parameter different than other segments and/or segment sets. The flashline heater 200 operates by applying heat to the reactor effluent to convert at least some of the liquid phase to gas phase as the reactor effluent flows through the flashline heater 200 to the product separator 300. Heat can be supplied by steam that flows into and/or through heating jackets that are attached around at least part of at least some of the segments 201. While the segments 201 are illustrated as being connected end-to-end, it is also contemplated that piping of smaller diameter than the segments 201 can be fluidly connected between any two of the segments 201 that are connected in series with one another. In aspects, FIG. 1 illustrates that an outlet stream 202 can connect an outlet of the flashline heater 200 to an inlet of the product separator 300. Alternative aspects contemplate that the outlet of the flashline heater 200 can be connected directly to an inlet of the product separator 300, without presence of stream 202. In some aspects, the phase composition of the reactor effluent can change while the reactor effluent flows through the flashline heater 200, e.g., the reactor effluent can contain more gas phase immediately before entering the product separator 300 than the reactor effluent contains when entering the flashline heater 200.

The product separator 300 is configured to receive the reactor effluent from the flashline heater 200 (e.g., via the outlet stream 202). The product separator 300 is configured to separate the reactor effluent into a vapor product portion containing hydrocarbons and light components (e.g., hydrogen, nitrogen, water vapor) and a solid product portion containing the polymer and residual hydrocarbons (e.g., unreacted comonomer, diluent) that are entrained in the polymer or otherwise residually remaining with the polymer. The vapor product portion can flow from the product separator 300 via untreated vapor stream 302, and the solid product portion can flow from the product separator 300 via solids stream 304. The untreated vapor stream 302 and the solids stream 304 can include conduits or pipes that are connected to a respective vapor outlet and solids outlet of the product separator 300.

In aspects, the product separator 300 may be embodied as a flash tank, a flash vessel, a flash chamber, a cyclone, a high efficiency cyclone, or a centrifuge. Generally, the product separator 300 can be a hollow vessel having at least a portion thereof in a conical shape. The top of the product separator 300 can have a diameter that is greater than a diameter of the bottom of the product separator 300. In some aspects, the product separator 300 can have a diameter in a range of about 8 in to about 30 ft (0.203 m to 9.14 m); alternatively, a range of about 1 ft to about 30 ft (0.305 m to 9.14 m); alternatively, from about 8 in to about 12 in (0.203 m to 0.305 m). In aspects where the product separator 300 is a cyclone separator, the cone angle of the cyclone separator can be about 45° to about 80°; alternatively, about 50° to about 75°; alternatively, about 60° to about 65°; alternatively, about 45° to about 60°; alternatively, about 60° to about 70°; alternatively, about 70° to about 80°.

In aspects, the product separator 300 may additionally comprise any equipment associated with the product separator 300, such as control devices (e.g., a PID controller) and measurement instruments (e.g., thermocouples), and level control and measurement devices.

In aspects, the product separator 300 is a single vessel. In other aspects, the product separator 300 can include two vessels connected in series. For example, a first vessel of the product separator 300 may be embodied as a flash tank, a flash vessel, a flash chamber, a cyclone, a high efficiency cyclone, or a centrifuge having the aspects described herein; and the second vessel of the product separator 300 can be embodied as another flash tank, flash vessel, flash chamber, cyclone, high efficiency cyclone, or centrifuge, that is connected in series and downstream of the first vessel. In such aspects, the inlet of the first vessel can be configured to receive the reactor effluent, and the polymer outlet of the first vessel through which the solid polymer flows may be directly connected to an inlet of the second vessel; alternatively, the polymer outlet of the first vessel may be coupled to the inlet of the second vessel via a conduit or pipe. The pipe or conduit that connects the two vessels of the product separator 300 may include a continuous valve of similar configuration of continuous take-off valve 122 that is configured to continuously allow flow of polymer (e.g., containing residual hydrocarbons as described herein) from the first vessel to the second vessel where further separation of residual hydrocarbons from the polymer can occur, before flowing the polymer from the polymer outlet of the second vessel to the purge column 400.

In one or more embodiments, the vapor product portion recovered in stream 302 from the product separator 300 may comprise unreacted olefin monomer, unreacted olefin comonomer, diluent, water vapor, or combinations thereof. Examples of compounds that can be present in the vapor product portion include water vapor, hydrogen, nitrogen, methane, ethylene, ethane, propylene, propane, butane, isobutane, pentane, hexane, 1-hexene, or combinations thereof. In an embodiment, the olefin (e.g., ethylene) may be present in a range of from about 0.1 wt % to about 15 wt %; alternatively, from about 1.5 wt % to about 10 wt %; alternatively, from about 2 wt % to about 7 wt %; alternatively, about 5 wt % based on a total weight of the untreated vapor stream 302. The diluent (e.g., isobutane) may be present in a range from about 80 wt % to about 98 wt %; alternatively, from about 85 wt % to about 96 wt %; alternatively, about 90 wt % based on a total weight of the untreated vapor stream 302. Water vapor may be present in the vapor product portion in a range of from 10 ppmw to 1 wt %; alternatively, from 10 ppmw to 100 ppmw; alternatively, from 20 ppmw to 70 ppmw; alternatively, from 30 ppmw to 50 ppmw, based on a total weight of the untreated vapor stream 302.

The purge column 400 is coupled to the product separator 300 via the solids stream 304. The purge column 400 is configured to receive the polymer from the solids stream 304, and is configured to flow a purge gas through the polymer particles to remove at least a portion of any residual hydrocarbons (e.g., unreacted olefin monomer, any optional olefin comonomer, any diluent, or combinations thereof) entrained or otherwise remaining within the polymer. Purge gas stream 406 can be connected to an inlet of the purge column 400, e.g., on the side near the bottom of the purge column 400 and configured to provide a purge gas (e.g., nitrogen; an inert hydrocarbon such as ethane, propane, n-butane, isobutane, pentane, or mixtures thereof; ethylene, propylene, or any other hydrocarbon) to the purge column 400. The purge column 400 can be operated at appropriate conditions (e.g., temperature, pressure, inert gas flow rate, polymer residence time) such that the inert gas flows through the polymer particles present in the purge column 400, removes entrained hydrocarbon(s) from the polymer particles, moves upwardly through the purge column 400 with the removed hydrocarbon(s), and exits the purge column 400 along with the previously entrained hydrocarbon(s) in a degas stream 402. The degassed polymer can be recovered via polymer stream 404. The purge gas stream 406, the degas stream 402, and the polymer stream 404 may each flow in respective conduits or pipes that are connected to the purge column 400.

The purge column 400 can be configured for plug flow of polymer product from top to bottom of the vessel. The residence time of polymer in the purge column 400 can be at least 10 minutes; alternatively, at least 30 minutes; alternatively, about 1 hr; alternatively, from about 1 hr to about 6 hrs; alternatively, from about 1 hr to about 8 hrs; alternatively, from about 1 hr to about 16 hrs. The operating pressure of the purge column 400 can be a vacuum pressure, atmospheric pressure, or greater than atmospheric pressure. In a particular aspect, the pressure of the purge column 400 can be a pressure in the range of from about 0 psia to about 50 psia (about-0.101 MPaa to about 0.345 MPaa).

While one purge column 400 is illustrated in FIG. 1, it is contemplated that purging/degassing can take place in two or more purge columns operated in parallel and having the same configuration as purge column 400, with the purge gas stream 406 feeding to each purge column, degas streams combining into degas stream 402, and polymer streams combining into polymer stream 404. Alternatively, it is contemplated that degassing can take place in two or more purge columns connected in series and having the same configuration as purge column 400, with the purge gas stream 406 feeding to each purge column, degas streams combining into degas stream 402, a polymer stream of the first purge column feeding to the second purge column, and so on, until the final purge column produces the polymer stream 404. Alternatively still, it is contemplated that degassing can take place in multiple purge column trains operated in parallel, where each train contains two or more purge columns connected in series. As with other aspects, the purge gas stream 406 can be configured to feed to each purge column in the trains, each purge column can produce a degas stream that combines with other degas streams to form the degas stream 402, and the final purge column of each train having a polymer stream that combines with the other polymer streams of the final purge column in other trains to form polymer stream 404.

The first treater 700 has an inlet connected to the untreated vapor stream 302. The first treater 700 can include one or more vessels. When more than one vessel is included in the first treater 700, the vessels can be operated in parallel such that at least one of the vessels is on-line to treat (e.g., remove one or more contaminants from) the untreated vapor stream 302, while the other of the vessels is off-line being regenerated, standing by to go on-line, or also on-line but not saturated with contaminants. The one or more contaminants removed by the first treater 700 may include water, oxygen, carbon dioxide, sulfur compounds, alcohols, acetylene, or combinations thereof. Regeneration techniques for treaters as disclosed herein can be found in U.S. Pat. No. 10,046, 306, which is incorporated by reference in its entirety.

In some aspects, the first treater 700 can include from 1 to 20 pairs of vessels operated in parallel, where each vessel of the pair is operated in parallel with the other vessel of the pair. Each vessel of the first treater 700 can have a desiccant therein arranged in one or more desiccant beds. For example, and without limitation, each vessel may have from 1 to 30, from 1 to 20, or from 1 to 15 desiccant beds. The desiccant in the one or more desiccant beds the first treater 700 may be molecular sieve, activated alumina, silica gel, montmorillonite clay, calcium oxide, calcium sulfate, calcium chloride, activated carbon, metal salts, phosphorus-containing desiccant compounds, or combinations thereof. The term "molecular sieve" refers to a material having a fixed, open-network structure, usually crystalline, that may be used to separate hydrocarbons from the impurities disclosed herein by selective occlusion of one or more of the impurities. An example of a molecular sieve is a zeolite, which has a silicate lattice, often in association with aluminum, boron, gallium, iron, and/or titanium. An example of a zeolite is a 13× molecular sieve. In accordance with one or more embodiments, the molecular sieves have a pore size of 10 angstroms (Å) or more. An example of activated alumina is sodium treated alumina.

The gaseous components of the untreated vapor stream 302 (e.g., unreacted olefin monomer, unreacted olefin comonomer, diluent, water vapor, any other light gases that can be present such as nitrogen and/or oxygen) are introduced to the first treater 700 at a bottom of one or more of the vessels of the first treater 700. The gaseous components flow through the desiccant beds in the first treater 700, for example, from the bottom to the top (alternatively, from top to bottom) of the on-line vessel(s), and one or more contaminants are removed from the hydrocarbons by the desiccant contained in the first treater 700. The treated hydrocarbons flow in gas phase from the first treater 700 to the monomer diluent recovery unit 500 via treated vapor stream 702.

Treatment conditions in the first treater 700 can include a residence time sufficient to remove at least a portion of the contaminants from the untreated vapor stream 302. Treatment conditions may include a temperature in the range of about 1.6° C. to about 27° C.; alternatively, about 4.4° C. to about 21° C.; alternatively, about 7.2° C. to about 15° C. Treatment conditions may include a pressure in the range of about 600 psig (about 4.14 MPag) to about 850 psig (about 5.86 MPag); alternatively, about 700 psig (about 4.83 MPag) to about 825 psig (about 5.69 MPag); alternatively, about 750 psig (about 5.17 MPag) to about 800 psig (about 5.52 MPag).

The treated vapor stream 702 generally includes a level of contaminants that is less than a level of contaminants present in the untreated vapor stream 302. The amount of a contaminant or multiple contaminants may be measured and monitored in treated vapor stream 702 using techniques known in the art with the aid of this disclosure, for example, high performance liquid chromatography (HPLC), gas chromatography (GC), or Raman spectroscopy. The contaminants may be measured in an online apparatus in treated vapor stream 702 or a sample may be taken from the treated vapor stream 702 and subsequently analyzed for contaminant concentration. In embodiments, the treated vapor stream 702 may include less than 100, 90, 80, 70, 60, 50, 40, 30, 20, 10, 9, 8, 7, 6, 5, 4, 3, 2, or 1 ppmw of contaminants based on a total weight of the treated vapor stream 702.

A diluent nitrogen recovery unit (DNRU) 600 can be coupled to the purge column 400 via the degas stream 402. The diluent nitrogen recovery unit 600 can be configured to separate the degas stream 402 into an inert gas stream 602 (e.g., containing the purge gas) and an untreated liquid stream 604 containing residual diluent any other residual hydrocarbons (e.g., comonomer) in the liquid phase. The diluent nitrogen recovery unit 600 can utilize any technique for separating the inert gas used for degassing from the residual hydrocarbons, for example, compression, distillation (e.g., utilizing cryogenic and/or vacuum conditions), absorption, membrane separation, condensation, or combinations thereof. In aspects, the inert gas stream 602 can be used as the purge gas stream 406, or can supply the inert gas as at least a portion of the purge gas stream 406.

In an embodiment, the olefin (e.g., ethylene) may be present in a range of from about 0.1 wt % to about 10 wt %; alternatively, from about 1.5 wt % to about 10 wt %; alternatively, from about 2 wt % to about 7 wt %; alternatively, about 4 wt % based on a total weight of the untreated liquid stream 604. The diluent (e.g., isobutane) may be present in a range from about 80 wt % to about 98 wt %; alternatively, from about 85 wt % to about 96 wt %; alternatively, about 90 wt % based on a total weight of the untreated liquid stream 604. Water may be present in the untreated liquid stream 604 in an amount in a range of from 10 ppmw to 1 wt %; alternatively, from 50 ppmw to 200 ppmw; alternatively, from 60 ppmw to 150 ppmw; alternatively, from 80 ppmw to 120 ppmw, based on a total weight of the untreated liquid stream 604.

The second treater 800 has an inlet connected to the untreated liquid stream 604. The second treater 800 can include one or more vessels. When more than one vessel is included in the second treater 800, the vessels can be operated in parallel such that at least one of the vessels is on-line to treat (e.g., remove one or more contaminants from) the untreated liquid stream 604, while the other of the vessels is off-line being regenerated, standing by to go on-line, or also on-line but not saturated with contaminants. The one or more contaminants removed by the second treater 800 may include water, oxygen, carbon dioxide, sulfur compounds, alcohols, acetylene, or combinations thereof.

In some aspects, the second treater 800 can include from 1 to 20 pairs of vessels operated in parallel, where each vessel of the pair is operated in parallel with the other vessel of the pair. Each vessel of the second treater 800 can have a desiccant therein arranged in one or more desiccant beds. For example, and without limitation, each vessel may have from 1 to 30, from 1 to 20, or from 1 to 15 desiccant beds. The desiccant in the one or more desiccant beds the second treater 800 may be molecular sieve, activated alumina, silica gel, montmorillonite clay, calcium oxide, calcium sulfate, calcium chloride, activated carbon, metal salts, phosphorus-containing desiccant compounds, or combinations thereof. The term "molecular sieve" refers to a material having a fixed, open-network structure, usually crystalline, that may be used to separate hydrocarbons from the impurities disclosed herein by selective occlusion of one or more of the impurities. An example of a molecular sieve is a zeolite, which has a silicate lattice, often in association with aluminum, boron, gallium, iron, and/or titanium. An example of a zeolite is a 13× molecular sieve. In accordance with one or more embodiments, the molecular sieves have a pore size of 10 angstroms (Å) or more. An example of activated alumina is sodium treated alumina.

The liquid components of the untreated liquid stream 604 (e.g., diluent, water, any other liquid components that may be present) are introduced to the second treater 800 at a bottom of one or more of the vessels of the second treater 800. The liquid components flow through the desiccant beds in the second treater 800, for example, from the bottom to the top (alternatively, from top to bottom) of the on-line vessel(s), and one or more contaminants are removed from the hydrocarbons by the desiccant contained in the second treater 800. The treated hydrocarbons flow in liquid phase from the second treater 800 to the monomer diluent recovery unit 500 via treated liquid stream 802.

Treatment conditions in the second treater 800 can include a residence time sufficient to remove at least a portion of the contaminants from the untreated liquid stream 604. Treatment conditions may include a temperature in the range of about 1.6° C. to about 27° C.; alternatively, about 4.4° C. to about 21° C.; alternatively, about 7.2° C. to about 15° C. Treatment conditions may include a pressure in the range of about 600 psig (about 4.14 MPag) to about 850 psig (about 5.86 MPag); alternatively, about 700 psig (about 4.83 MPag) to about 825 psig (about 5.69 MPag); alternatively, about 750 psig (about 5.17 MPag) to about 800 psig (about 5.52 MPag).

The treated liquid stream 802 generally includes a level of contaminants that is less than a level of contaminants present in the untreated liquid stream 604. The amount of a contaminant or multiple contaminants may be measured and monitored in treated liquid stream 802 using techniques known in the art with the aid of this disclosure, for example, high performance liquid chromatography (HPLC), gas chromatography (GC), or Raman spectroscopy. The contaminants may be measured in an online apparatus in treated liquid stream 802 or a sample may be taken treated liquid stream 802 and subsequently analyzed for contaminant concentration. In embodiments, the treated liquid stream 802 may include less than 100, 90, 80, 70, 60, 50, 40, 30, 20, 10, 9, 8, 7, 6, 5, 4, 3, 2, or 1 ppmw of contaminants based on a total weight of the treated liquid stream 802.

Figure 2:
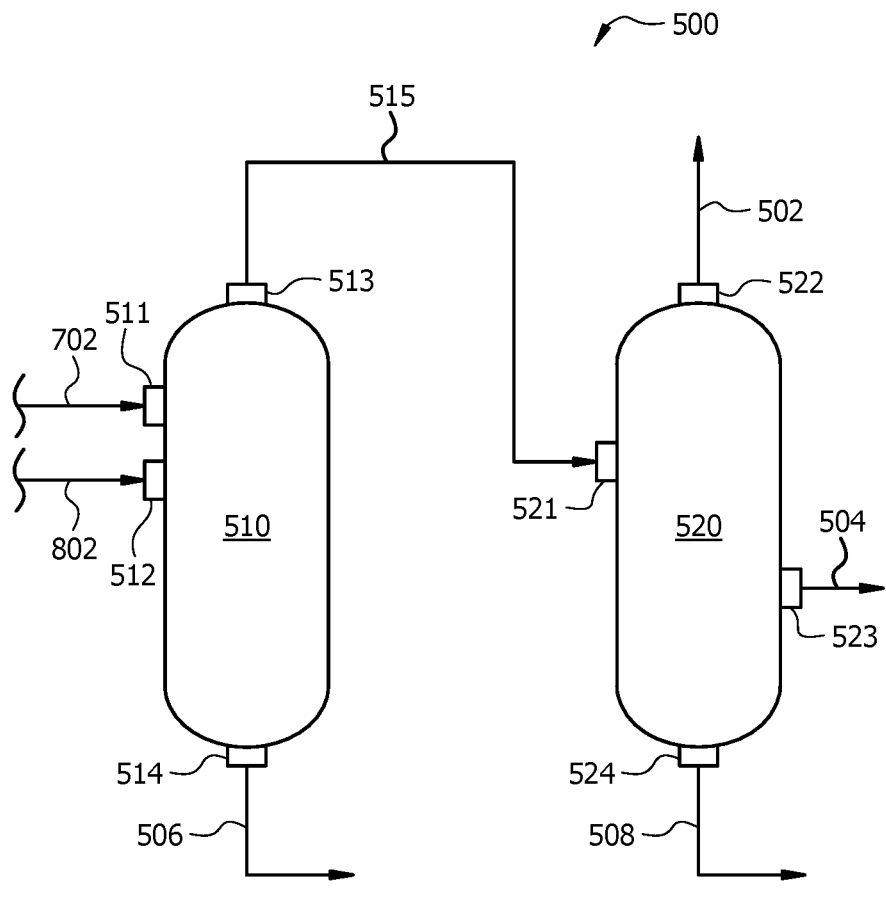
FIG. 2 illustrates a schematic diagram of an embodiment of a monomer diluent recovery unit.

FIG. 2 illustrates a schematic diagram of an embodiment of a monomer diluent recovery unit 500.

The monomer diluent recovery unit (MDRU) 500 can include a heavies column 510 and a lights column 520, connected in series such that the lights column 520 is downstream of the heavies column 510. The heavies column 510 can be referred to as a dehexanizer, and the lights column 520 can be referred to as a deethanizer. In aspects, the monomer diluent recovery unit 500 does not contain a desiccant based treater.

The heavies column 510 is configured to receive the treated vapor stream 702 and the treated liquid stream 802 and to produce an unreacted olefin comonomer stream 506 comprising unreacted olefin comonomer and an overhead stream 515 comprising hydrocarbons and other components that are lighter than the olefin comonomer. The treated vapor stream 702 can be connected to a first inlet 511 of the heavies column 510, and the treated liquid stream 802 can be connected to a second inlet 512 of the heavies column 510. The first inlet 511 and the second inlet 512 are shown as being connected to a side of the heavies column 510. While the first inlet 511 is shown as being above the second inlet 512, it is contemplated that the first inlet 511 can be connected to the side of the heavies column 510 below the second inlet 512. The unreacted olefin comonomer stream 506 is connected to outlet 514 on the bottom of the heavies column 510; however, the outlet 514 can alternatively be positioned on the side of the heavies column 510. In aspects, the unreacted olefin comonomer stream 506 can be coupled to the loop slurry polymerization reactor 100. The overhead stream 515 can be connected to the outlet 513 of the heavies column 510. The heavies column 510 can have any number and configuration of trays, baffles, packing, or other structure(s) configured to perform distillation of the components of the treated vapor stream 702 and the treated liquid stream 802 into the unreacted olefin comonomer stream 506 and overhead stream 515. In aspects, the unreacted olefin comonomer stream 506 can be treated (e.g., with desiccant) prior to being recycled to a polymerization reactor (e.g., the loop slurry polymerization reactor 100).

The lights column 520 is configured to receive the overhead stream 515 from the heavies column 510 and to produce an unreacted olefin monomer stream 502 comprising olefin monomer, a recycle grade diluent stream 504 comprising the diluent, and optionally, an olefin-free diluent stream 508. The overhead stream 515 can be connected to the lights column 520 via the inlet 521. The unreacted olefin monomer stream 502 can be connected to the lights column 520 via outlet 522. The recycle grade diluent stream 504 can be connected to the lights column 520 via outlet 523. The olefin-free diluent stream 508 can be connected to the lights column 520 via outlet 524. Any combination of the unreacted olefin monomer stream 502, the recycle grade diluent stream 504, and the olefin-free diluent stream 508 can be coupled to the loop slurry polymerization reactor 100 for recycle to the reactor 100. The lights column 520 can have any number and configuration of trays, baffles, packing, or other structure(s) configured to perform distillation of the components of the overhead stream 515 into the unreacted olefin monomer stream 502, recycle grade diluent stream 504, and optionally, an olefin-free diluent stream 508.

It is contemplated that various equipment associated with monomer and diluent recovery systems (e.g., valves, pumps, accumulators, piping, reboilers, condensers, heaters, compressors, control systems, safety equipment, and the like), while not shown for purposes of clarity, can be included in the monomer diluent recovery unit 500 according to techniques known in the art with the aid of this disclosure.

The heavies column 510 can be operated at conditions (e.g., temperature, pressure, number of trays, reflux rate, heating rate, and other parameters for controlling the operation of a distillation column) suitable to recover heavy hydrocarbons in the unreacted olefin comonomer stream 506 and components lighter than the comonomer (e.g., diluent, olefin monomer, nitrogen, oxygen, hydrogen, or combinations thereof) in the overhead stream 515 which can be fed to the lights column 520. For example, the heavies column 510 can be operated at a temperature gradient in a range of from about 15° C. (59° F.) to about 233° C. (451.4° F.), alternatively, from about 20° C. (68° F.) to about 200° C. (392° F.), alternatively, from about 20° C. (68° F.) to about 180° C. (356° F.); and a pressure in a range of from about 0.101 MPaa (14.7 psia) to about 3.64 MPaa (527.9 psia), alternatively, from about 0.108 MPaa (15.7 psia) to about 2.40 MPaa (348 psia), alternatively, from about 0.586 MPaa (85 psia) to about 2.00 MPaa (290 psia).

The lights column 520 can be operated at conditions (e.g., temperature, pressure, number of trays, reflux rate, heating rate, and other parameters for controlling the operation of a distillation column) suitable to recover the unreacted olefin monomer and gases lighter than olefin monomer (e.g., nitrogen, hydrogen, oxygen, water vapor, or combinations thereof) in an overhead stream 515 which is the unreacted olefin monomer stream 502 and diluent in a side stream or bottom stream which is the diluent stream 504. For example, the lights column 520 can be operated at a temperature gradient from bottom to top in a range of from about 50° C. (122° F.) to about 5° C. (41° F.); alternatively, from about 40° C. (104° F.) to about 5° C. (41° F.); alternatively, from about 30° C. (86° F.) to about 5° C. (41° F.), and a pressure in a range of from 0.101 MPaa (14.7 psia) to about 3.64 MPaa (527.9 psia), alternatively, from about 0.108 MPaa (15.7 psia) to about 2.40 MPaa (348 psia), alternatively, from about 0.586 MPaa (85 psia) to about 2.00 MPaa (290 psia).

A process disclosed herein can include separating a polymer product stream 120 into an untreated vapor stream 302, an untreated liquid stream 604, and a polymer stream 404 comprising solid polymer; treating the untreated vapor stream 302 with a first desiccant to produce a treated vapor stream 702; treating the untreated liquid stream 604 with a second desiccant to produce a treated liquid stream 802; and introducing the treated vapor stream 702 and the treated liquid stream 802 to a monomer diluent recovery unit 500. In aspects, the monomer diluent recovery unit 500 does not contain a desiccant based treater. In the process, the treated vapor stream 702 and the treated liquid stream 802 are introduced to the heavies column 510 of the monomer diluent recovery unit 500. In some aspects, the treated vapor stream 702 is introduced to the heavies column 510 separately from the treated liquid stream 802. In other aspects, the treated vapor stream 702 and the treated liquid stream 802 can be combined prior to introducing the combined stream to the heavies column 510.

In the process, treating the untreated vapor stream 302 is performed in a first treater 700 comprising the first desiccant and treating the untreated liquid stream 604 is performed in a second treater 800 comprising the second desiccant.

The process can additionally include separating, in the monomer diluent recovery unit 500, the treated vapor stream 702 and the treated liquid stream 802 into an unreacted olefin monomer stream 502, an unreacted olefin comonomer stream 506, and a recycle grade diluent stream 504. The separating can also produce an olefin-free diluent stream 508 and the process can also include recovering, from the monomer diluent recovery unit 500, an olefin-free diluent stream 508. In aspects, none of the unreacted olefin monomer stream 502, the unreacted olefin comonomer stream 506, the recycle grade diluent stream 504, any olefin-free diluent stream 508, or combinations thereof is treated with a desiccant.

In the process, the separating the polymer product stream 120 into the untreated vapor stream 302, the untreated liquid stream 604, and the polymer stream 404 can include: flashing the polymer product stream 120 to form a flash vapor portion and a flash solid portion; purging the flash solid portion (e.g., in the purge column 400) with a purge gas to form a purge vapor portion and a purge solid portion; introducing the purge vapor portion to the diluent nitrogen recovery unit 600; and recovering the untreated liquid stream 604 from the diluent nitrogen recovery unit 600.

In the process, the streams can have any combination of concentrations of components described herein.

The process can also include introducing a catalyst deactivator via stream 124 into the polymer product stream 120, wherein treating the untreated vapor stream 302 removes the catalyst deactivator from the untreated vapor stream 302 to produce the treated vapor stream 702, wherein treating the untreated liquid stream 604 removes the catalyst deactivator from the untreated liquid stream 604 to produce the treated liquid stream 802.

ADDITIONAL DESCRIPTION

Processes and system have been described. The present application is also directed to the subject-matter described in the following numbered paragraphs (referred to as "para" or "paras"):

Para 1. A process comprising: separating a polymer product stream into an untreated vapor stream, an untreated liquid stream, and a polymer stream comprising solid polymer; treating the untreated vapor stream with a first desiccant to produce a treated vapor stream; treating the untreated liquid stream with a second desiccant to produce a treated liquid stream; and introducing the treated vapor stream and the treated liquid stream to a monomer diluent recovery unit.

Para 2. The process of Para 1, wherein the monomer diluent recovery unit does not contain a desiccant based treater.

Para 3. The process of Para 1 or 2, wherein the monomer diluent recovery unit comprises a heavies column and a lights column, wherein the treated vapor stream and the treated liquid stream are introduced to the heavies column.

Para 4. The process of Para 3, wherein the treated vapor stream is introduced to the heavies column separately from the treated liquid stream.

Para 5. The process of any one of Paras 1 to 4, wherein treating the untreated vapor stream is performed in a first treater comprising the first desiccant, wherein treating the untreated liquid stream is performed in a second treater comprising the second desiccant.

Para 6. The process of any one of Paras 1 to 5, further comprising: separating, in the monomer diluent recovery unit, the treated vapor stream and the treated liquid stream into an unreacted olefin monomer stream, an unreacted olefin comonomer stream, and a recycle grade diluent stream.

Para 7. The process of Para 6, wherein none of the unreacted olefin monomer stream, the unreacted olefin comonomer stream, and the recycle grade diluent stream is treated with a desiccant.

Para 8. The process of Para 6 or 7, further comprising: recovering, from the monomer diluent recovery unit, an olefin-free diluent stream.

Para 9. The process of Para 8, wherein none of the unreacted olefin monomer stream, the unreacted olefin comonomer stream, the recycle grade diluent stream, and the olefin-free diluent stream is treated with a desiccant.

Para 10. The process of any one of Paras 1 to 9, wherein the untreated vapor stream contains water vapor, wherein the untreated liquid stream contains water.

Para 11. The process of any one of Paras 1 to 10, wherein separating the polymer product stream into the untreated vapor stream, the untreated liquid stream, and the polymer stream comprises: flashing the polymer product stream to form a flash vapor portion and a flash solid portion; purging the flash solid portion with nitrogen to form a purge vapor portion and a purge solid portion; introducing the purge vapor portion to a diluent nitrogen recovery unit; and recovering the untreated liquid stream from the diluent nitrogen recovery unit.

Para 12. The process of any one of Paras 1 to 11, wherein the untreated vapor stream comprises water vapor in a range of from about 10 ppmw to about 1 wt % based on a total weight of the untreated vapor stream, wherein the treated vapor stream comprises water vapor in a range of less than 1 ppmw based on a total weight of the treated vapor stream.

Para 13. The process of any one of Paras 1 to 12, wherein the untreated liquid stream comprises water in a range of from about 10 ppmw to about 1 wt % based on a total weight of the untreated liquid stream, wherein the treated liquid stream comprises water in a range of less than 1 ppmw based on a total weight of the treated liquid stream.

Para 14. The process of any one of Paras 1 to 13, further comprising: introducing a catalyst deactivator into the polymer product stream, wherein treating the untreated vapor stream removes the catalyst deactivator from the untreated vapor stream to produce the treated vapor stream, wherein treating the untreated liquid stream removes the catalyst deactivator from the untreated liquid stream to produce the treated liquid stream.

Para 15. A polymerization system comprising: a polymerization reactor configured to polymerize one or more olefin monomers to produce a solid polymer; a polymer product stream connected to an outlet of the polymerization reactor and configured to receive a reactor effluent containing the solid polymer; a product recovery system coupled to the polymer product stream and configured to receive the reactor effluent and to separate the reactor effluent into an untreated vapor stream, an untreated liquid stream, and a polymer stream; a first treater coupled to the untreated vapor stream and containing a first desiccant configured to remove one or more of a plurality of contaminants from the untreated vapor stream to produce a treated vapor stream; a second treater coupled to the untreated liquid stream and containing a second desiccant configured to remove one or more the plurality of contaminants from the untreated liquid stream to produce a treated liquid stream; and a monomer diluent recovery unit coupled to the first treater and to the second treater and configured to receive the treated vapor stream from the first treater and the treated liquid stream from the second treater.

Para 16. The polymerization system of Para 15, wherein the monomer diluent recovery unit comprises a heavies column and a lights column coupled to the heavies column, wherein the heavies column is configured to receive the treated vapor stream and the treated liquid stream.

Para 17. The polymerization system of Para 16, wherein the heavies column is configured to receive the treated vapor stream at a first inlet and configured to receive the treated liquid stream at a second inlet.

Para 18. The polymerization system of Para 16 or 17, wherein the heavies column is configured to separate the treated vapor stream and the treated liquid stream into an unreacted olefin comonomer stream and an overhead stream, wherein the lights column is configured to receive the overhead stream and to separate the overhead stream into an unreacted olefin monomer stream and a recycle grade diluent stream, and optionally an olefin-free diluent stream.

Para 19. The polymerization system of any one of Paras 15 to 18, wherein the product recovery system comprises: a product separator configured to separate the reactor effluent into a solid stream and the untreated vapor stream; a purge column connected to the product separator and configured to receive the solid stream form the product separator, wherein the purge column is further configured to separate the solid stream into a degas stream and the polymer stream; and a diluent nitrogen recovery unit connected to the purge column and configured to receive the degas stream from the purge column.

Para 20. The polymerization system of any one of Paras 15 to 19, further comprising: a catalyst deactivation stream connected to the polymer product stream and configured to introduce a catalyst deactivator into the polymer product stream.

Para 21. A process comprising retrofitting a polymerization process to add or move treaters to be upstream of the monomer diluent recovery unit. After retrofitting, treaters may still be present downstream of the monomer diluent recovery unit; alternatively, after retrofitting, no treater is present downstream of the monomer diluent recovery unit.

Para 22. A polymerization system comprising one or more treaters that are upstream of a monomer diluent recovery unit. The polymerization system may have treaters downstream of the monomer diluent recovery unit; alternatively, no treater is present downstream of the monomer diluent recovery unit.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A process comprising:

separating a polymer product stream into an untreated vapor stream, an untreated liquid stream, and a polymer stream comprising solid polymer;

treating the untreated vapor stream with a first desiccant to produce a treated vapor stream;

treating the untreated liquid stream with a second desiccant to produce a treated liquid stream; and introducing the treated vapor stream and the treated liquid stream to a monomer diluent recovery unit.

2. The process of claim 1, wherein the monomer diluent recovery unit does not contain a desiccant based treater.

3. The process of claim 1, wherein the monomer diluent recovery unit comprises a heavies column and a lights column, wherein the treated vapor stream and the treated liquid stream are introduced to the heavies column.

4. The process of claim 3, wherein the treated vapor stream is introduced to the heavies column separately from the treated liquid stream.

5. The process of claim 1, wherein treating the untreated vapor stream is performed in a first treater comprising the first desiccant, wherein treating the untreated liquid stream is performed in a second treater comprising the second desiccant.

6. The process of claim 1, further comprising:

separating, in the monomer diluent recovery unit, the treated vapor stream and the treated liquid stream into an unreacted olefin monomer stream, an unreacted olefin comonomer stream, and a recycle grade diluent stream.

7. The process of claim 6, wherein none of the unreacted olefin monomer stream, the unreacted olefin comonomer stream, and the recycle grade diluent stream is treated with a desiccant.

8. The process of claim 6, further comprising:

recovering, from the monomer diluent recovery unit, an olefin-free diluent stream.

9. The process of claim 8, wherein none of the unreacted olefin monomer stream, the unreacted olefin comonomer stream, the recycle grade diluent stream, and the olefin-free diluent stream is treated with a desiccant.

10. The process of claim 1, wherein the untreated vapor stream contains water vapor, wherein the untreated liquid stream contains water.

11. The process of claim 1, wherein separating the polymer product stream into the untreated vapor stream, the untreated liquid stream, and the polymer stream comprises:

flashing the polymer product stream to form a flash vapor portion and a flash solid portion;

purging the flash solid portion with nitrogen to form a purge vapor portion and a purge solid portion;

introducing the purge vapor portion to a diluent nitrogen recovery unit; and recovering the untreated liquid stream from the diluent nitrogen recovery unit.

12. The process of claim 1, wherein the untreated vapor stream comprises water vapor in a range of from about 10 ppmw to about 1 wt % based on a total weight of the untreated vapor stream, wherein the treated vapor stream comprises water vapor in a range of less than 1 ppmw based on a total weight of the treated vapor stream.

13. The process of claim 1, wherein the untreated liquid stream comprises water in a range of from about 10 ppmw to about 1 wt % based on a total weight of the untreated liquid stream, wherein the treated liquid stream comprises water in a range of less than 1 ppmw based on a total weight of the treated liquid stream.

14. The process of claim 1, further comprising:

introducing a catalyst deactivator into the polymer product stream, wherein treating the untreated vapor stream removes the catalyst deactivator from the untreated vapor stream to produce the treated vapor stream, wherein treating the untreated liquid stream removes the catalyst deactivator from the untreated liquid stream to produce the treated liquid stream.

15. A polymerization system comprising:

a polymerization reactor configured to polymerize one or more olefin monomers to produce a solid polymer;

a polymer product stream connected to an outlet of the polymerization reactor and configured to receive a reactor effluent containing the solid polymer;

a product recovery system coupled to the polymer product stream and configured to receive the reactor effluent and to separate the reactor effluent into an untreated vapor stream, an untreated liquid stream, and a polymer stream;

a first treater coupled to the untreated vapor stream and containing a first desiccant configured to remove one or more of a plurality of contaminants from the untreated vapor stream to produce a treated vapor stream;

a second treater coupled to the untreated liquid stream and containing a second desiccant configured to remove one or more the plurality of contaminants from the untreated liquid stream to produce a treated liquid stream; and a monomer diluent recovery unit coupled to the first treater and to the second treater and configured to receive the treated vapor stream from the first treater and the treated liquid stream from the second treater.

16. The polymerization system of claim 15, wherein the monomer diluent recovery unit comprises a heavies column and a lights column coupled to the heavies column, wherein the heavies column is configured to receive the treated vapor stream and the treated liquid stream.

17. The polymerization system of claim 16, wherein the heavies column is configured to receive the treated vapor stream at a first inlet and configured to receive the treated liquid stream at a second inlet.

18. The polymerization system of claim 16, wherein the heavies column is configured to separate the treated vapor stream and the treated liquid stream into an unreacted olefin comonomer stream and an overhead stream, wherein the lights column is configured to receive the overhead stream and to separate the overhead stream into an unreacted olefin monomer stream and a recycle grade diluent stream, and optionally an olefin-free diluent stream.

19. The polymerization system of claim 15, wherein the product recovery system comprises:

a product separator configured to separate the reactor effluent into a solid stream and the untreated vapor stream;

a purge column connected to the product separator and configured to receive the solid stream form the product separator, wherein the purge column is further configured to separate the solid stream into a degas stream and the polymer stream; and a diluent nitrogen recovery unit connected to the purge column and configured to receive the degas stream from the purge column.

20. The polymerization system of claim 15, further comprising:

a catalyst deactivation stream connected to the polymer product stream and configured to introduce a catalyst deactivator into the polymer product stream.

* * * * *